US012688000B2

(12) United States Patent
Yang et al.

(10) Patent No.: US 12,688,000 B2
(45) Date of Patent: Jul. 21, 2026

(54) MANAGEMENT OF PROFESSIONALLY GENERATED AND USER-GENERATED AUDIO CONTENT

(71) Applicant: Dolby Laboratories Licensing Corporation, San Francisco, CA (US)

(72) Inventors: Shaofan Yang, Beijing (CN); Kai Li, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 341 days.

(21) Appl. No.: 18/683,199

(22) PCT Filed: Aug. 11, 2022

(86) PCT No.: PCT/US2022/040089
§ 371 (c)(1),
(2) Date: Feb. 12, 2024

(87) PCT Pub. No.: WO2023/018889
PCT Pub. Date: Feb. 16, 2023

(65) Prior Publication Data
US 2025/0130756 A1      Apr. 24, 2025

Related U.S. Application Data

(60) Provisional application No. 63/288,521, filed on Dec. 10, 2021, provisional application No. 63/243,634, filed on Sep. 13, 2021.

(30) Foreign Application Priority Data

Aug. 13, 2021    (WO) ................ PCT/CN2021/112543

(51) Int. Cl.
*G06F 3/16*        (2006.01)
*H04S 1/00*        (2006.01)
*H04S 7/00*        (2006.01)

(52) U.S. Cl.
CPC ................ *G06F 3/16* (2013.01); *H04S 1/007* (2013.01); *H04S 7/00* (2013.01); *H04S 2400/11* (2013.01)

(58) Field of Classification Search
CPC ... G06F 3/16; H04S 1/007; H04S 7/00; H04S 2400/11; G10L 25/03; G10L 25/51
See application file for complete search history.

(56)                References Cited

U.S. PATENT DOCUMENTS

2009/0171671 A1      7/2009   Seo
2019/0028766 A1      1/2019   Wold
2021/0056984 A1*     2/2021   Zhang .................... H04R 5/033

FOREIGN PATENT DOCUMENTS

CN        107452401 A    12/2017
CN        108235145 A     6/2018
(Continued)

OTHER PUBLICATIONS

Lu, Zhiqin et al.; "Research on the Influence of New Media Technology on Internet Short Video Content Production under Artificial Intelligence Background"; Hindawi; Complexity; vol. 2021; Article ID 8875700; pp. 1-14 (14 pages).
(Continued)

*Primary Examiner* — Vivian C Chin
*Assistant Examiner* — Annabelle Kang

(57)                ABSTRACT

A system for managing user-generated content (UGC) and professionally generated content (PGC) is disclosed. The system is programmed to receive digital audio data having two channels from a social media platform. The system is programmed to extract spatial features that capture differences in the two channels from the digital audio data. The system is programmed to also extract temporal features, spectral features, and background features from the digital audio data. The system is programmed to then use the
(Continued)

extracted features to determine whether to process the digital
audio data as UGC or PGC before playback.

20 Claims, 6 Drawing Sheets

(56) References Cited

FOREIGN PATENT DOCUMENTS

| | | | |
|----|-----------------|----|---------|
| CN | 104918060 | B | 8/2018 |
| CN | 108830639 | A | 11/2018 |
| CN | 112418011 | A | 2/2021 |
| CN | 112507165 | A | 3/2021 |
| CN | 110149529 | B | 5/2021 |
| WO | 2011045424 | A1 | 4/2011 |
| WO | 2011129655 | A2 | 10/2011 |

OTHER PUBLICATIONS

Seo, Jeong-Hun et al.; "An Improved Method for Objective Quality
Assessment of Multichannel Audio Codecs"; IEICE Trans. Funda-
mentals; vol. E94-A; No. 8; Aug. 2011; pp. 1747-1752 (6 pages).

\* cited by examiner

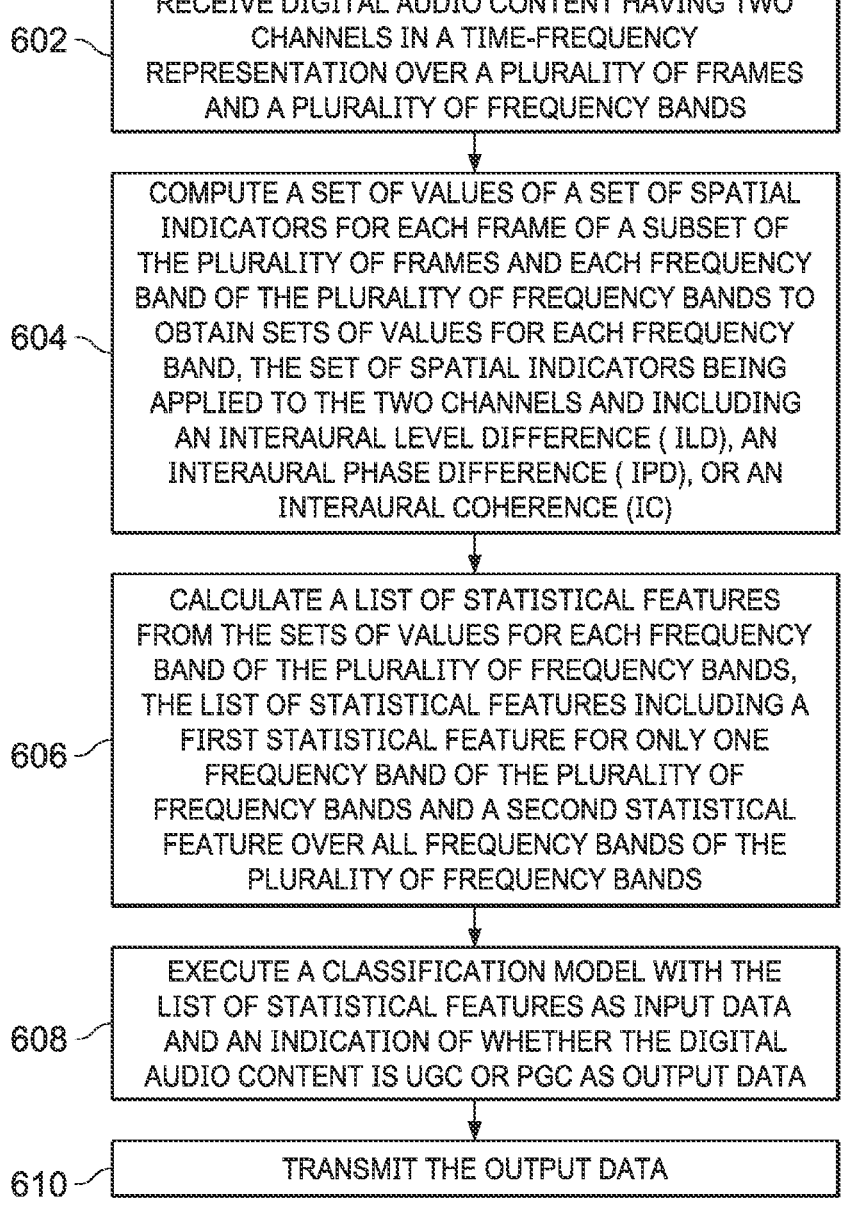

602 — RECEIVE DIGITAL AUDIO CONTENT HAVING TWO CHANNELS IN A TIME-FREQUENCY REPRESENTATION OVER A PLURALITY OF FRAMES AND A PLURALITY OF FREQUENCY BANDS

604 — COMPUTE A SET OF VALUES OF A SET OF SPATIAL INDICATORS FOR EACH FRAME OF A SUBSET OF THE PLURALITY OF FRAMES AND EACH FREQUENCY BAND OF THE PLURALITY OF FREQUENCY BANDS TO OBTAIN SETS OF VALUES FOR EACH FREQUENCY BAND, THE SET OF SPATIAL INDICATORS BEING APPLIED TO THE TWO CHANNELS AND INCLUDING AN INTERAURAL LEVEL DIFFERENCE ( ILD), AN INTERAURAL PHASE DIFFERENCE ( IPD), OR AN INTERAURAL COHERENCE (IC)

606 — CALCULATE A LIST OF STATISTICAL FEATURES FROM THE SETS OF VALUES FOR EACH FREQUENCY BAND OF THE PLURALITY OF FREQUENCY BANDS, THE LIST OF STATISTICAL FEATURES INCLUDING A FIRST STATISTICAL FEATURE FOR ONLY ONE FREQUENCY BAND OF THE PLURALITY OF FREQUENCY BANDS AND A SECOND STATISTICAL FEATURE OVER ALL FREQUENCY BANDS OF THE PLURALITY OF FREQUENCY BANDS

608 — EXECUTE A CLASSIFICATION MODEL WITH THE LIST OF STATISTICAL FEATURES AS INPUT DATA AND AN INDICATION OF WHETHER THE DIGITAL AUDIO CONTENT IS UGC OR PGC AS OUTPUT DATA

610 — TRANSMIT THE OUTPUT DATA

FIG. 6

MANAGEMENT OF PROFESSIONALLY GENERATED AND USER-GENERATED AUDIO CONTENT

CROSS-REFERENCE TO RELATED APPLICATIONS

This application is a U.S. National Stage of International Application No. PCT/US2022/040089, filed Aug. 11, 2022, which claims priority to International Patent Application No. PCT/CN2021/112543 filed 13 Aug. 2021; U.S. Provisional Patent Application No. 63/243,634 filed 13 Sep. 2021; and U.S. Provisional Patent Application No. 63/288,521 filed 10 Dec. 2021, which are incorporated herein by reference in their entireties.

TECHNICAL FIELD

The present application relates to audio processing and playback.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Technical advances have made it easier to produce and share digital media content. Therefore, the amount and variety of digital media content available for consumption continues to grow, from traditional television programs, movies, and music to modern vlogs, podcasts, and audiobooks. Today, both professionally generated content (PGC) and user-generated content (UGC), which correspond to two categories of producing digital media content, are widely available for consumption on social media platforms. PGC refers to digital media content that is first recorded by professional devices in a recording studio and post-produced by a professional engineer or artist. UGC refers to digital media content that is recorded in non-professional environments, such as homes or offices, often with user devices, such as tablets, smartphones, or laptops. The discussion will focus on digital audio content hereinafter.

How digital audio content is produced directly affects how digital audio content should be processed for playback. To properly convey the sound effects created during the production process, PGC is to be processed by a well-designed signal processing chain before being delivered to output devices, such as speakers or headphones. For example, such a signal processing chain can include a virtualizer, a dialog enhancer, a volume leveler, or an equalizer. On the other hand, UGC often has quality issues due to possible noise or reverberation in the recording environment or limitations of the recording equipment, which would not have been resolved in any post-production. Consequently, UGC generally needs to be enhanced to cure the defects before being delivered to output devices for consumption. Occasionally, digital audio content generated using a user device or in a non-professional environment is also post-produced with audio editing or mixing tools. Such digital audio content may be considered as PGC for the purpose of determining how to process the digital audio content before playback.

As digital audio content is often submitted to a social media platform without accompanying information on how the digital audio content is produced, it would therefore be helpful to determine whether such digital audio content is PGC or UGC to provide an optimal playback experience to users.

SUMMARY

A computer-implemented method of classifying audio as UGC and PGC is disclosed. The method comprises receiving, by a processor, digital audio content having two channels in a time-frequency representation over a plurality of frames and a plurality of frequency bands. The method also comprises computing, by the processor, a respective set of values of a corresponding set of spatial indicators for each frame of at least a subset of the plurality of frames and each frequency band of the plurality of frequency bands to obtain sets of values for each frequency band, the set of spatial indicators being applied to the two channels and including at least one of an interaural level difference (ILD), an interaural phase difference (IPD), or an interaural coherence (IC). In addition, the method comprises calculating a set of statistical features from the sets of values for each frequency band of the plurality of frequency bands, the set of statistical features including a first statistical feature for only one frequency band of the plurality of frequency bands and a second statistical feature over multiple frequency bands of the plurality of frequency bands. The method further comprises executing a classification model with the set of statistical features as input data and an indication of whether the digital audio content is UGC or PGC as output data; and transmitting the output data.

Techniques described in this specification can be advantageous over conventional audio processing techniques. For example, the method enables effective audio playback by identifying appropriate processing pipelines based on audio production conditions. The method offers classification accuracy by considering different types of audio features that capture differences between UGC and PGC in various audio domains. Specifically, the consideration of spatial features is directly tied to the two-channel playback experience.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 6 illustrates an example process performed by an audio management computer system in accordance with some embodiments described herein.

DESCRIPTION OF THE EXAMPLE EMBODIMENTS

Figure 1:
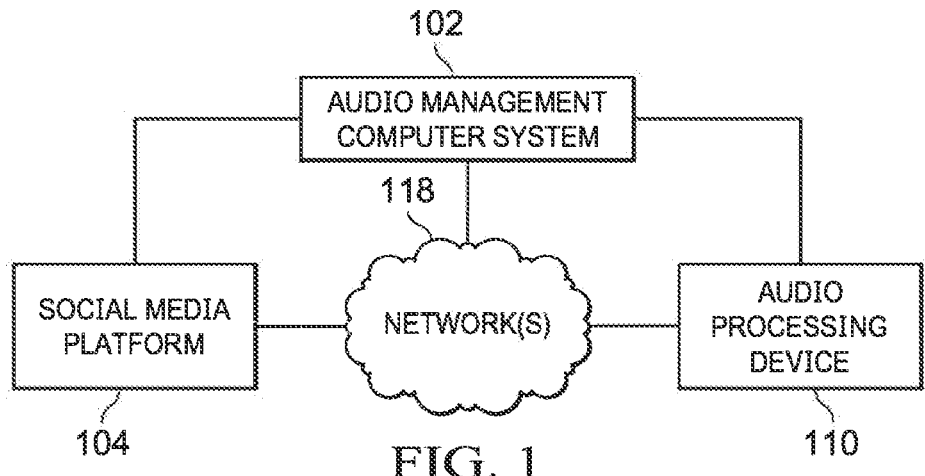
FIG. 1 illustrates an example networked computer system in which various embodiments may be practiced.

In the following description, for the purposes of explanation, numerous specific details are set forth in order to provide a thorough understanding of the example embodiment(s) the present invention. It will be apparent, however, that the example embodiment(s) may be practiced without these specific details. In other instances, well-known structures and devices are shown in block diagram form in order to avoid unnecessarily obscuring the example embodiment(s).

Embodiments are described in sections below according to the following outline:

1. GENERAL OVERVIEW
2. EXAMPLE COMPUTING ENVIRONMENTS
3. EXAMPLE COMPUTER COMPONENTS
4. FUNCTIONAL DESCRIPTIONS
   4.1. SPATIAL FEATURE EXTRACTION
   4.2. TEMPORAL AND SPECTRAL FEATURE EXTRACTION
   4.3. BACKGROUND FEATURE EXTRACTION
   4.4. CONSTRUCTION AND EXECUTION OF CLASSIFICATION MODEL
5. EXAMPLE PROCESSES
6. HARDWARE IMPLEMENTATION

1. General Overview

A system for managing user-generated content and professionally generated content is disclosed. In some embodiments, a system is programmed to receive digital audio content having two channels from a social media platform. The system is programmed to extract spatial features that capture differences in the two channels from the digital audio content. The system is programmed to also extract temporal features, spectral features, and background features from the audio data. The system is programmed to then use the extracted features to determine whether to process the digital audio data as UGC or PGC before playback.

In some embodiments, the system first builds a digital model for determining whether given digital audio data is UGC or PGC. Examples of PGC include soundtracks or albums professionally recorded in a studio, while examples of UGC include sounds recorded using a smartphone or another user device. The system can collect training data that includes UGC segments and PGC segments that satisfy certain requirements. For example, each segment can be required to have a length no less than a minimum length, and the segments can be required to cover a plurality of types of sound effects or recording environments. In some embodiments, the system first extracts features from each segment in the training data. The system extracts spatial features that relate to how the sources of sounds reside in different locations, temporal features that relate to how the sources and nature of sounds change over time, and spectral features related to how the sounds exist in different frequencies. The system also separates the background portion from the digital audio data and specifically extracts temporal and spectral features from the background portion as background features.

In some embodiments, the system extracts spatial features for each segment converted into a time-frequency representation by computing statistics of values of spatial indicators over multiple frames for each of a plurality of frequency bands. The spatial indicators include the interaural level difference (ILD), the interaural phase difference (IPD), or the interaural coherence (IC). The statistics are taken as the spatial features and include the mean, variance, or other aggregates for each frequency band and more complex aggregates across all the frequency bands.

In some embodiments, the system also extracts temporal features from each segment or the background portion thereof. Example temporal features include the energy flux, zero-crossing rate, or maximum amplitude. The system also extracts spectral features from each segment converted into the frequency domain or the background portion converted into the spectral domain. Example spectral features include the spectral centroid, spectral flux, spectral density, spectral roll-off, or Mel-frequency cepstral coefficients (MFCC).

In some embodiments, the system combines the extracted features into a feature vector to represent each segment. For example, the extracted features can include multiple spatial features per frequency band and additional spatial features over all the frequency bands. The system can create a feature vector that includes an index of each frequency band, the multiple spatial features for that frequency band, and the additional spatial features. This feature vector can be enhanced with the temporal features, spectral features, or background features.

In some embodiments, the system can then use at least the set of feature vectors created from the training data to build the digital model that generates a label indicating whether the digital audio data is UGC or PGC, or a probability that the digital audio data is UGC or PGC. For a digital model based on supervised training, each feature vector together with a label indicating whether the underlying segment is UGC or PGC is used respectively as input data and expected output data to train the digital model. The system can store the digital model for future use or send the digital model to another device for use.

In some embodiments, with a stored digital model, the system can receive new audio data having two channels from a social media platform. The system can extract all the features from the new audio data in the same way as it extracts all the features from each segment in the training set, to generate a new feature vector. The system can then run the digital model with the new feature vector as input data to generate a label or a probability as output data. The system can then transmit the label to another device, such as a display device or an audio processing system to enhance the new audio data for playback depending on the new audio data is determined to be UGC or PGC.

The system presents technical benefits. The system addresses the technical problem of classifying audio as UGC or PGC, which determines how the audio should be further processed. The system enables effective audio playback by identifying appropriate processing pipelines based on audio production conditions. The system offers classification accuracy by considering different types of audio features that capture differences between UGC and PGC in various audio domains. Specifically, the consideration of spatial features is directly tied to the two-channel playback experience.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises an audio management computer system ("system") 102, a social networking platform 104 or additional social network platforms, and an audio processing device 110 or additional audio processing devices, which are communicatively coupled through direct physical connections or via one or more networks 118.

In some embodiments, the system 102 is programmed or configured with data structures and/or database records that are arranged to host or execute functions related to analyzing audio data to distinguish UGC and PGC. The system 102 can comprise a server farm, a cloud computing platform, or a parallel computer. The system 102 can also comprise a cellular phone, a computer tablet, a computer laptop, a personal digital assistant, or any other computing facility with sufficient computing power in data processing, data storage, and network communication for the above-described functions.

In some embodiments, the social media platform 104 is configured to receive and host digital media, including digital audio data. The digital media may come from various sources, include systems or devices associated with professional studios or ordinary consumers. The social media platform 104 can also be configured to provide a user interface for accessing the digital media data in an original or processed form. In certain embodiments, the system 102 is integrated into the social media platform 104. The social media platform 104 can comprise a server farm, a cloud computing platform, a parallel computer, or any other computing facility with sufficient computing power in data processing, data storage, and network communication for the above-described functions.

In some embodiments, the audio processing device 110 is configured to process audio data in preparation for playback depending on how the audio data was produced. The audio processing device 110 can utilize separate processing pipelines for UGC and PGC. In certain embodiments, the audio processing device 110 is integrated the system 102. The audio processing device 110 can comprise a server farm, a cloud computing platform, a parallel computer, or any other computing facility with sufficient computing power in data processing, data storage, and network communication for the above-described functions.

The one or more networks 118 may be implemented by any medium or mechanism that provides for the exchange of data between the various elements of FIG. 1. Examples of the networks 118 include, without limitation, one or more of a cellular network, a near-field communication (NFC) network, a Local Area Network (LAN), a Wide Area Network (WAN), the Internet, a terrestrial or satellite link, etc.

In some embodiments, the system 102 is programmed to receive audio data from the social media platform 104. The audio data is assumed to have at least two channels for future playback. The system 102 is programmed to build a digital model for classifying the audio data as UGC or PGC based on training data received from the social media platform 104 or one or more other audio sources. For new audio data subsequently received from the social media platform 104, the system 102 is programmed to provide a classification using the digital model and send the new audio data with the classification to the audio processing device 110 for further processing in preparation for playback. The system 102 can also send the digital model to the audio processing device 110, which can then obtain a classification using the digital model for any new audio data received from the system 102 or directly from the social media platform 104.

3. Example Computer Components

Figure 2:
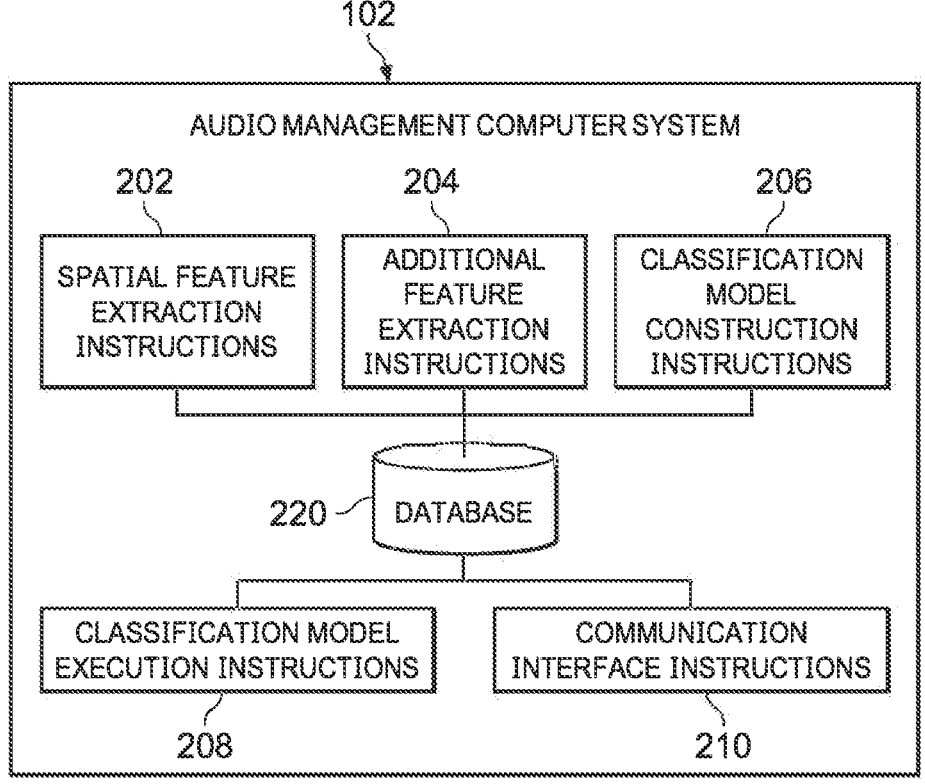
FIG. 2 illustrates example components of an audio management computer system in accordance with the disclosed embodiments.

FIG. 2 illustrates example components of an audio management computer system in accordance with the disclosed embodiments. The figure is for illustration purposes only and the system 102 can comprise fewer or more functional or storage components. Each of the functional components can be implemented as software components, general or specific-purpose hardware components, firmware components, or any combination thereof. Each of the functional components can also be coupled with one or more storage components (not shown). A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the system 102 comprises spatial feature extraction instructions 202, additional feature extraction instructions 204, classification model training instructions 206, classification model execution instructions 208, and communication interface instructions 210. The system 102 also comprises a database 220.

In some embodiments, the spatial feature extraction instructions 202 enable computation of spatial features from given audio data in the time domain for distinguishing UGC and PGC. The spatial features relate to how the sources of sounds reside in different locations. The spatial features can be extracted by converting the given audio data into a time-frequency representation.

In some embodiments, the additional feature extraction instructions 204 enable computation of additional features from given audio data in the time domain or a determined background portion of the given audio data for distinguishing UGC and PGC. The additional features can include temporal and spectral features. The temporal features relate to how the sources and nature of sounds change over time. The spectral features related to how the sounds exist in different frequencies. The spectral features can be extracted by converting the given audio data to the frequency domain.

In some embodiments, the classification model construction instructions 206 enable construction of a classification model for distinguishing UGC and PGC. The classification model is configured to receive extracted features noted above as input data and optionally a label of UGC or PGC as expected output data. The construction can include supervised or unsupervised learning.

In some embodiments, the classification model execution instructions 208 enable execution of the classification model for distinguishing UGC and PGC. Given new audio data, specific features as noted above can be extracted and used as input data in executing the classification model to generate a label of UGC or PGC.

In some embodiments, the communication interface instructions 210 enable communication with other systems or devices through computer networks. The communication can include receiving audio data from the social media platform 104 or other sound sources. The communication can also include transmitting audio data classifications or additional data to the audio processing device 110 or a display device.

In some embodiments, the database 220 is programmed or configured to manage storage of and access to relevant data, such as received audio data, digital models, features extracted from received audio data, or results of executing the digital models.

4. Functional Descriptions

The capabilities and arrangement of the recording equipment, the nature of the recording environment, and the capabilities of the post-production tools individually or in combination result in differences between PGC and UGC in terms of spatial features, temporal and spectral features, and background features. Therefore, in some embodiments, the system 102 extracts these features from digital audio data having at least two channels and classify the digital audio data using the extracted features.

4.1. Spatial Feature Extraction

The capabilities and arrangement of the recording equipment and the capabilities of the post-production tools can significantly determine the spatial features of digital audio data. The spatial features can be represented with respect to the two channels to reach the two ears or more channels corresponding to alternative configurations of audio reception. For example, whether the recording was performed in a stereo setting with two or more microphones or specifically in a binaural setting with two microphones arranged as if they were worn by two ears of a head could affect the spatial features of the recorded audio.

More specifically, for PGC, each of various sound sources of an audio mix generally has a defined position and spectral bandwidth in the sound field. The placement of sound sources, possibly including the creation of virtual sound sources, is mainly optimized using panning techniques, which involve making creative choices under given technical constraints based on human perception of sound localization. For UGC, the sounds are often directly recorded by user devices without post-production in which panning techniques can be applied. Therefore, PGC often has more dynamic and diverse spatial cues than UGC, which result in larger differences between the two channels to reach the two ears.

In some embodiments, the system 102 receives digital audio data having two channels ("two-channel audio data") and a number of frames in the time domain originally generated by one or more input devices, such as one or more microphones located in a recording studio or embedded in a mobile device, and possibly post-produced. The system 102 then generates, from the two-channel audio data, two-channel content as a time-frequency representation (TFR) (a view of a signal as a function of time represented over both time and frequency) through known transformations, such as a discrete Short-Time Fourier Transform (STFT) or a Complex Quadrature Mirror Filter (CQMF).

In some embodiments, the two-channel content as a TFR comprises first-channel content and second-channel content corresponding to the two channels, which can be respectively represented as $S1(f, l)$ and $S2(f, l)$, where $f \in [1, F]$ denotes a frequency index, l denotes a frame index, and $S1(f, l)$ or $S2(f, l)$ denotes an complex frequency response (including amplitude and phase) for the frame l that is in the frequency $f$. The set of frequency bands can correspond to frequency intervals in the human auditory range, for example. The system 102 considers multiple spatial indicators to extract spatial patterns or features from the two-channel content. Each spatial indicator is used to compare the two channels across the frequency bands.

Figure 3:
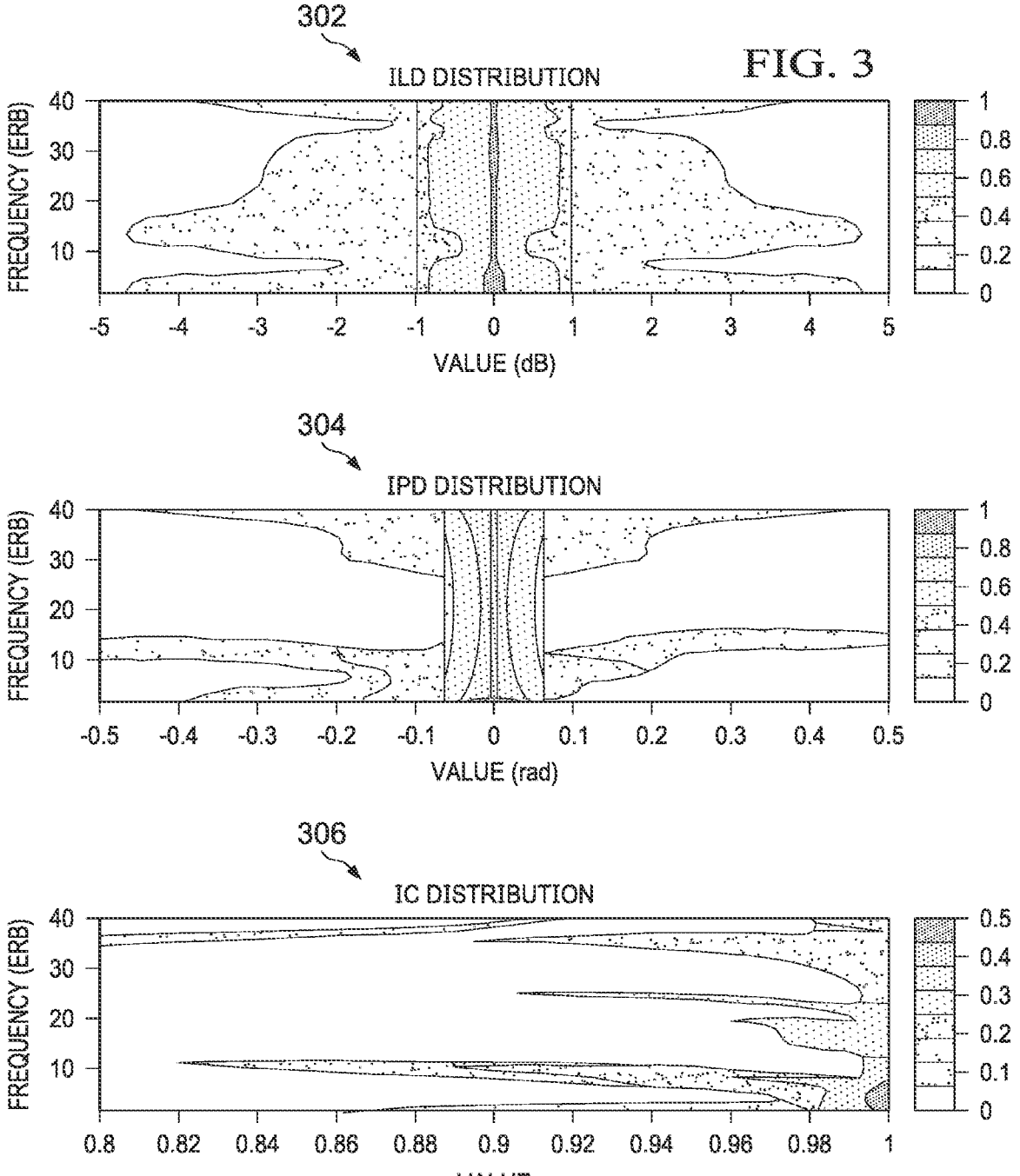
FIG. 3 illustrates a distribution of values of each spatial indicator of interest in each of predetermined frequency bands for sample UGC.
Figure 4:
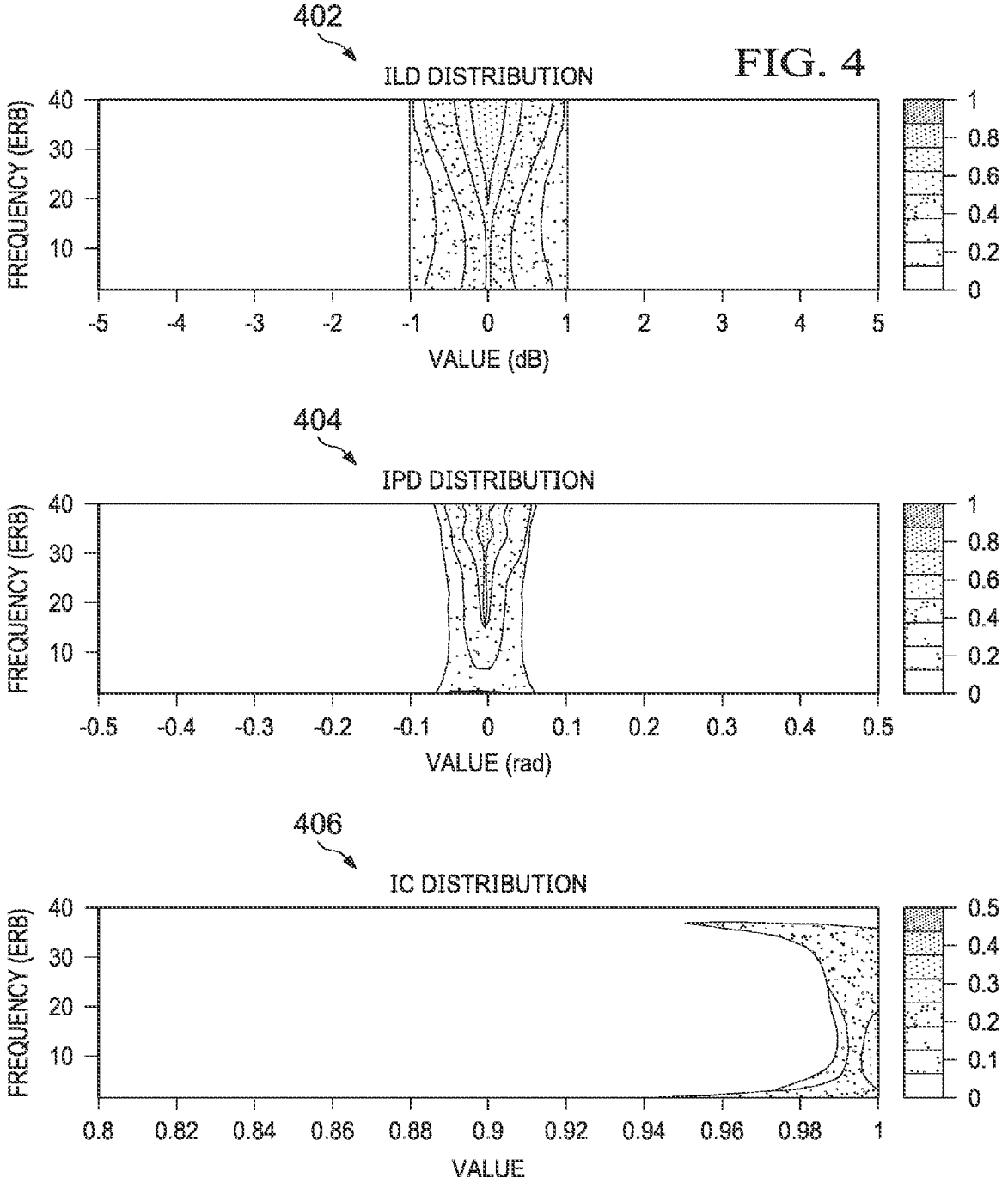
FIG. 4 illustrates a distribution of values of each spatial indicator of interest in each of predetermined frequency bands for sample PGC
Figure 5:
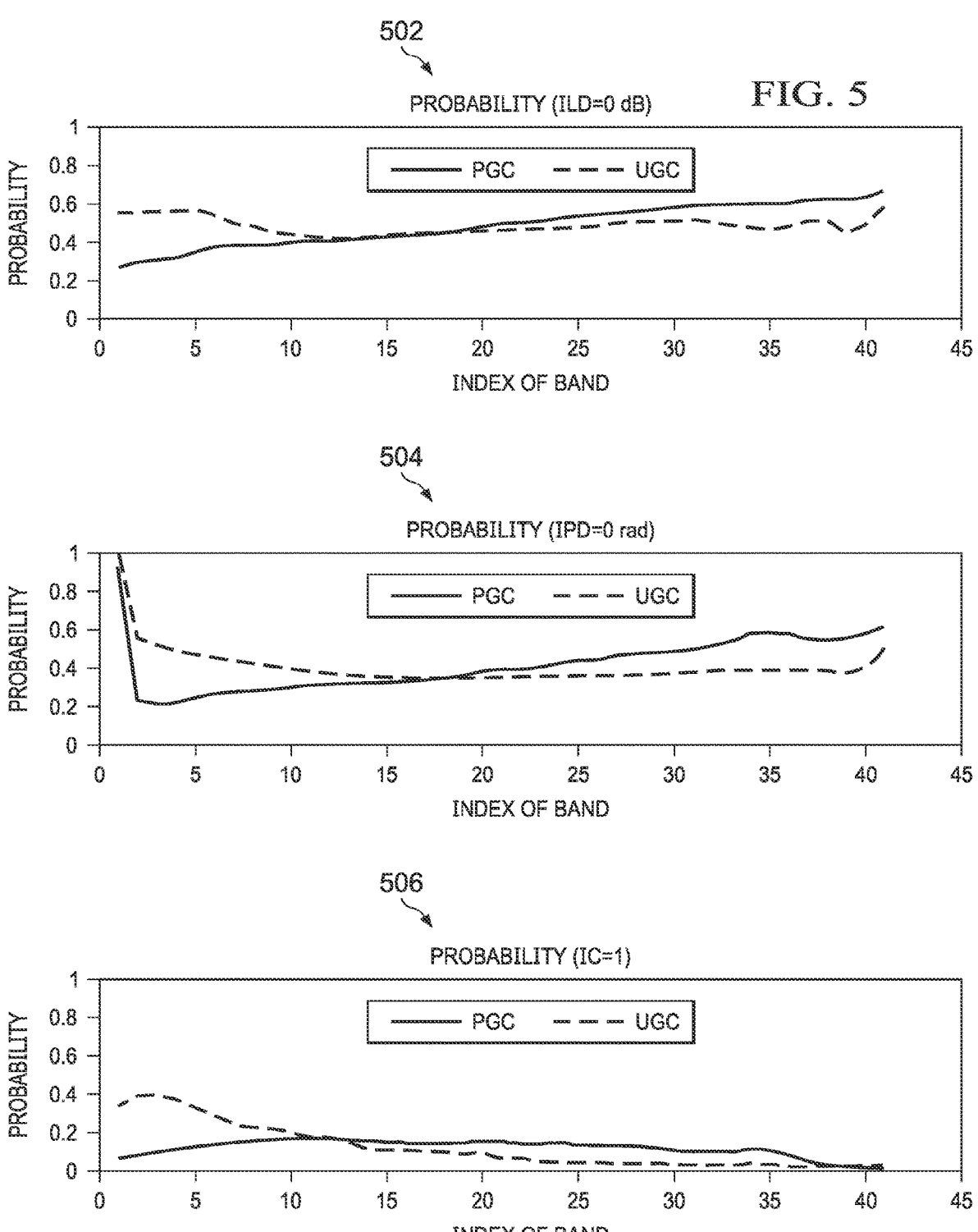
FIG. 5 illustrates a probability curve indicating the probability that a value of each spatial indicator equals the value corresponding to the peak of the distribution in each of predetermined frequency bands for the sample UGC and PGC.

FIG. 3 illustrates a distribution of values of each spatial indicator of interest in each of predetermined frequency bands for sample UGC, such as 80 hours of cellphone-recorded audio. FIG. 4 illustrates a distribution of values of each spatial indicator of interest in each of predetermined frequency bands for sample PGC, such as 100 hours of movie audio. In FIG. 3 or FIG. 4, for each frequency band along the y-axis, each point indicates a probability that the spatial indicator takes on the value at the x-axis according to the legend on the right, and the probabilities add up to one. The probabilities can be estimated by normalized counts in the sample data, for example. FIG. 5 illustrates a probability curve indicating the probability that a value of each spatial indicator equals the value corresponding to the peak of the distribution in each of predetermined frequency bands for the sample UGC and PGC. FIGS. 3-5 illustrate why spatial indicators can be effectively used to distinguish UGC and PGC.

In some embodiments, the multiple spatial indicators include the interaural level difference (ILD). Each predetermined frequency band k contains a set of frequency coefficients or values $f_{k\_i}$, with i being a positive integer. For example, when the sampling rate of the content is 48 kHz, 1024 Fast Fourier Transform (FFT) coefficient can be calculated for the waveform per frame. 41 frequency bands can be obtained based on the Equivalent-Rectangular-Bandwidth (ERB), where the lower frequency bands contain fewer FFT coefficients, which leads to just one coefficient in the lowest frequency band. The ILD indicates an energy ratio of the first-channel content and the second-channel content and can be calculated for each frequency band k as follows:

$$ILD(k, l) = 10 \log_{10} \frac{\sum_i S1(f_{k\_i}, l)^2}{\sum_i S2(f_{k\_i}, l)^2} \tag{2}$$

where ILD in each frequency band k and each frame l is computed by the ratio of energy sums over the frequency values in the frequency band. The ILD distribution in each frequency band can comprise estimated probabilities from a normalized histogram over the set of all frames for that frequency band in the sample data. The plot 302 in FIG. 3 shows the ILD distribution for the sample UGC in terms of a set of possible energy value at the x-axis and the set of frequency bands at the y-axis. In the plot 302, the distribution centers around zero and appears uniform across the frequency bands. Therefore, the distributions peak at 0, and the UGC line of the plot 502 in FIG. 5 has a relatively constant value across the frequency bands. The plot 402 in FIG. 4 shows the ILD distribution for the sample PGC in terms of the set of possible energy value at the x-axis and the set of frequency bands at the y-axis. In the plot 402, the distribution also centers around zero, but to a higher degree for the higher frequency bands. Therefore, the distribution peaks at 0, and PGC line of the plot 502 in FIG. 5 has an upward trend as it moves from the lower frequency bands to the higher frequency bands. The difference in the ILD distribution between sample UGC and the sample PGC, as illustrated in the plot 502, can be attributed to the dynamic panning of sound sources over time in producing PGC. For most sound sources, the energy typically decays with the frequency rising. When the sound source is panned in directions other than straight ahead, which leads to an energy difference between the two channels to reach the two ears, the lower the frequency, the more probable deviation of the ILD from 0. Therefore, the probability at 0, which corresponds to no difference between the two channels, increases with the frequency rising.

In some embodiments, the multiple spatial indicators include the interaural phase difference (IPD). The IPD indicates a phase difference of the first-channel content and the second-channel content and is calculated for each frequency band k as follows:

$$IPD(k, l) = \text{Phase}\left[\sum_i S1(f_{k\_i}, l) \cdot S2 * (f_{k\_i}, l)\right] \quad (3)$$

where ·* represents taking conjunction of a complex value, and Phase[ ] represents taking the phase from a complex value.

The plot 304 in FIG. 3 shows the IPD distribution for the sample UGC in terms of a set of possible phase values at the x-axis and the set of frequency bands at the y-axis. In the plot 304, the distribution centers around zero except for the lowest frequency bands and appears uniform across the other frequency bands. Therefore, the distribution peaks at 0, and UGC line of the plot 504 in FIG. 5 has a relatively constant value across the frequency bands except that it drops from near 1 to about (0.4, 0.6) for the lowest frequency bands. The plot 404 in FIG. 4 shows the IPD distribution for the sample PGC in terms of the set of phase values at the x-axis and the set of frequency bands at the y-axis. In the plot 404, the distribution also centers around zero except for the lowest frequency bands but is wider for the higher frequency bands. Therefore, the distribution peaks at 0, and PGC line of the plot 504 in FIG. 5 has an upward trend as it moves from the lower frequency bands to the higher frequency bands except that it quickly drops from near 1 to about 0.2 for the very lowest frequency bands. As noted above, the IPD reflects the phase difference between the two channels reaching the two ears. A larger energy difference can cause a larger phase difference. Therefore, similar to the difference in the ILD distribution, the difference in the IPD distribution between the sample UGC and the sample PGC can be attributed to the dynamic panning of sound sources over time in producing PGC. However, since the lowest frequency band is designed to contain only one frequency coefficient, as noted above, the IPD is a constant 0, and thus the IPD distribution peaks at 0 for the lowest frequency band for UGC and PGC. In general, both ILD and IPD cues reflect the direction of the sound source and therefore they are used in pairs. FIG. 5 shows the statistical difference of IPD and ILD between PGC and UGC on all data frames. While the plots 502 and 504 appear to have similar trends, they could have different characteristics within an analysis window over a small number of frames. A classifier discussed below will automatically learn and select the most discriminative features by comparing IPD, ILD, and other features mentioned below in different frequency bands.

In some embodiments, the multiple spatial indicators include the interaural coherence (IC). To characterize the noise field, a widely used measure for the IC is the magnitude squared coherence (MSC). The IC indicates a value similarity between the first-channel content and the second-channel content and is calculated for each frequency band $f$ as follows:

$$IC(k, l) = \frac{\left|\sum_i S1(f_{k\_i}, l) \cdot S2(f_{k\_i}, l)\right|}{\sqrt{\sum_i S1(f_{k\_i}, l)^2 \cdot \sum_i S2(f_{k\_i}, l)^2}} \quad (4)$$

The plot 306 in FIG. 3 shows the IC distribution for the UGC in terms of the set of possible unit-less values at the x-axis and the set of frequency bands at the y-axis. In the plot 306, the distribution shows more of a center around 1 for the lower frequency bands. Therefore, the distribution generally peaks at 1, and UGC line of the plot 506 in FIG. 5 has a downward trend as it moves from the lower frequency bands to the higher frequency bands. The plot 406 in FIG. 4 shows the IC distribution for the sample PGC in terms of the set of unit-less values at the x-axis and the set of frequency bands at the y-axis. In the plot 406, the concentration has a light center around 1 and appears uniform across the frequency bands. Therefore, the distribution peaks at 0, and PGC line of the plot 506 in FIG. 5 has a relatively constant value. The difference in the IC distribution between the sample UGC and the sample PGC can be attributed to the nature of the recording equipment and the presence of noise in producing UGC. The two channels of diffuse noise (found in a non-professional environment) directly captured by two microphones (found in a user device) leads to a MSC that is a frequency-dependent function $MSC(f)=\text{sinc}(2\pi fd/c)$, where d represents the microphones distance, c represents the speed of sound in m/s, and $f$ represents the frequency. For frequencies above $f_0=c/2d$, the MSC becomes very low and thus the noise between two channels can be considered uncorrelated. For frequencies below $f_0$, the MSC becomes high and thus the noise between two channels is highly correlated, which corresponds to an IC of 1. Therefore, the IC distribution of UGC has high values in lower frequency bands and lower values in the higher frequency bands.

In some embodiments, the system 102 computes statistics related to the spatial indicators for the two-channel content. For each of the frequency bands, the system 102 applies a moving window of N frames to the two-channel content and computes a value of each spatial indicator for each window. For example, N could be 128. Each window and computed values are tied to a current frame. The N frames can include the current frame and immediately preceding frames. The N frames can also include immediately following frames when lookahead is possible.

In some embodiments, the system 102 then calculates aggregate values for each spatial indicator over all the frames that have an associated window for the entire two-channel content. The aggregate values form statistical features of the two-channel content that can be used to distinguish UGC and PGC. The aggregate values can include a mean, a variance, or an estimated peak for each frequency band, as further discussed below. For example, the system applies a moving window of 128 frames to the two-channel content. For the first frequency band, the system computes a first value of the ILD over frame 1 through frame 128, a second value of the ILD over frame 2 through frame 129, and so on. For the first frequency band, the system then computes a mean over all the values of the ILD as a statistical feature. The aggregate values can also include a ratio of estimated peaks across the frequency bands, also as further discussed below.

As illustrated in FIGS. 3-5, the distribution generally peaks at 0 dB for the ILD, 0 rad. for the IPD, and 1 for the IC. The mean is expected to be close to such a value at which the distribution peaks. The mean in expected to be different for the IC between UGC and PGC for different frequency bands. The variance is expected to be different for all of the ILD, IPD, and IC between UGC and PGC.

In some embodiments, an estimated peak can be computed from the two-channel content as follows:

$$V_{peak}(k) = \frac{1}{N}\sum_l |V(k, l) > th1 \,\&\, V(k, l) < th2| \quad (5)$$

where, V(k, l) can represent a value of the ILD, IPD, or IC for the frequency band k and the frame l (over an associated window), and th1 and th2 represent the lower bound and the upper bound near the value at which the distribution peaks to constrain the count N of V(k, l) under consideration. For example, for the ILD, th1=−0.5 and th2=0.5; for the IPD, th1=−0.0314 and th2=0.0314; for the IC, th1=0.99 and th2=1. The estimated peak is thus the average over values of a spatial indicator that fall in a range around the value at which the distribution of the values peaks. As illustrated in FIGS. 3-5, the estimated peak is expected to be different for the IC between UGC and PGC for different frequency bands.

In some embodiments, in addition to or instead of computing the aggregate values for comparing UGC and PGC on a frequency band basis, the system 102 computes a first ratio of estimated peaks over all the frequency bands as follows:

$$r_1 = \frac{\sum_{k=L_1}^{L_2} V_{peak}(k)}{\sum_{k=H_1}^{H_2} V_{peak}(k)} \quad (6)$$

where L1 and L2 are the cutoff band indices of the low frequency bands, and H1 and H2 are the cutoff band indices of the high frequency bands. As illustrated in FIGS. 3-5, the first ratio is expected to be different for all of the ILD, IPD, and IC between UGC and PGC.

In some embodiments, the system 102 computes a second ratio of estimated peaks over all the frequency bands as follows:

$$r_2 = \frac{\sum_{k=L_1}^{L_2} V_{peak}(k)}{\sum_{k=1}^{K} V_{peak}(k)} \quad (7)$$

where all the frequency bands are considered in the denominator. As illustrated in FIGS. 3-5, the second ratio is expected to be different for all of the ILD, IPD, and IC between UGC and PGC.

In some embodiments, the system 102 creates feature vectors from the statistical features for classification purposes. The statistical features can be weighted before forming a feature vector. For example, the ratios may be considered more discriminative and thus given more weight.

4.2. Temporal and Spectral Feature Extraction

The capabilities and arrangement of the recording equipment and the capabilities of the post-production tools can determine the temporal or spectral features of digital audio data. For example, in terms of temporal features, PGC might show more variations over time as a result of applying the panning techniques during post-production. For further example, in terms of spectral features, UGC may have values only in limited frequency bands due to the relatively low sensitivity of the microphones in user devices.

In some embodiments, the system 102 computes temporal features from the two-channel audio data. The system 102 first downmixes the two-channel audio data in the time domain to mono-channel audio data by taking the average of signals in the two channels. The system 102 then computes known temporal features from the mono-channel audio data, such as the energy distribution, energy flux, zero-crossing rate, or maximum amplitude. The system 102 then similarly creates feature vectors from the temporal features for classification purposes.

In some embodiments, the system 102 also then converts the mono-channel audio data to spectral audio data into the frequency domain. The system 102 then computes known spectral features form the spectral audio data, such as spectral centroid, spectral flux, spectral density, spectral roll-off, or the Mel-frequency cepstral coefficients (MFCC). The system 102 then similarly creates feature vectors from the spectral features for classification purposes.

4.3. Background Feature Extraction

The nature of the recording environment and the capabilities of the post-production tools can significantly determine the background features of digital audio data. For example, UGC may have more noise, while PGC may have more background sound effects.

In some embodiments, the system 102 first extracts background audio data from the two-channel audio data in the time domain using a background separation method known to someone skilled in the art, such as the REpeating Pattern Extraction Technique (REPET). The system 102 then computes the temporal and spectral features of the background audio data ("background features") using the same approaches described in the previous section. The system 102 similarly creates feature vectors from background features for classification purposes.

4.4. Construction and Execution of Classification Model

In some embodiments, the system 102 builds a digital model for classifying given two-channel audio data as UGC or PGC. A digital "model" in this context refers to a digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. The digital model can be trained using a set of UGC segments, each having two channels and being associated with a label of UGC, and a set of PGC segments, each having two channels and being associated with a label of PGC. The system 102 extracts the spatial features, temporal features, spectral features, or background features to generate a set of feature vectors as discussed in Sections 4.1 through 4.3 from each UGC segment and PGC segment. The system 102 then trains the digital model to generate a label of UGC or PGC for given two-channel audio data using the sets of feature vectors as input data and optionally the sets of corresponding labels as expected output data. The digital model can be a known classification model, such as the Gaussian Mixture Model (GMM), adaptive boosting algorithm, Support Vector Machine (SVM), or Deep Neural Network (DNN).

In some embodiments, the system 102 executes the digital model for specific two-channel audio data. The system 102 extracts a set of feature vectors as discussed in Sections 4.1 through 4.3 from the specific two-channel audio data. The system 102 then executes the digital model using the set of feature vectors as input data to generate a label of UGC or PGC as output data. The system 102 can cause a display of the label. The system 102 can also send the specific two-channel audio data to an appropriate processing system based on the label. For a label of UGC, the specific two-channel audio data is sent to a processing system configured to enhance UGC data. For a label of PGC, the specific two-channel audio data is sent to a processing system configured to enhance PGC data. The system 102 can also further process the specific two-channel data based on the label.

5. Example Processes

FIG. 6 illustrates an example process performed by an audio management computer system in accordance with some embodiments described herein. FIG. 6 is shown in simplified, schematic format for purposes of illustrating a clear example and other embodiments may include more, fewer, or different elements connected in various manners. FIG. 6 is each intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 602, the system 102 is programmed to receive digital audio content having two channels in a time-frequency representation over a plurality of frames and a plurality of frequency bands.

In step 604, the system 102 is programmed to compute a set of values of a set of spatial indicators for each frame of a subset of the plurality of frames and each frequency band of the plurality of frequency bands to obtain sets of values for each frequency band, the set of spatial indicators being applied to the two channels and including an interaural level difference (ILD), an interaural phase difference (IPD), or an interaural coherence (IC).

In some embodiments, the system 102 is specifically programmed to apply a moving window covering a current frame to the digital audio content and calculate the set of values of the set of spatial indicators over all frames covered by the moving window.

In step 606, the system 102 is programmed to calculate a list of statistical features from the sets of values for each frequency band of the plurality of frequency bands, the list of statistical features including a first statistical feature for only one frequency band of the plurality of frequency bands and a second statistical feature over all frequency bands of the plurality of frequency bands.

In some embodiments, the first statistical feature is a mean or a variance of values of a spatial indicator over the subset of frames for each spatial indicator of the set of spatial indicators. In other embodiments, the second statistical feature is a ratio, where the numerator of the ratio is related to a value of a spatial indicator that occurs most frequently for each frequency band of a subset of lowest frequency bands of the plurality of frequency bands, and the denominator of the ratio is related to a value of the spatial indicator that occurs most frequently for each frequency band of a subset of highest frequency bands of the plurality of frequency bands or for each frequency band of the plurality of frequency bands.

In some embodiments, the system 102 is programmed to receive digital audio data in a time domain comprising the plurality of frames and generate the digital audio content from the digital audio data. The system 102 is further programmed to compute a set of temporal features from the digital audio data. In other embodiments, the system 102 is programmed to generate processed audio data in a frequency domain from the digital audio data and compute a set of spectral features from the processed audio data. In additional embodiments, the system is further programmed to extract a background portion in a time domain from the digital audio data, generate a spectral portion in a frequency domain from the background portion, and compute a certain set of temporal features from the background portion and a certain set of spectral features from the spectral portion.

In some embodiments, the system 102 is programmed to receive a group of segments including a plurality of UGC segments and a plurality of PGC segments, each segment of the group of segments having two channels in a time-frequency representation. The system 102 is programmed to further compute a set of values of the set of spatial indicators for each frame of a plurality of frames in each segment of the group of segments and each frequency band of the plurality of frequency bands to obtain a group of sets of values for each frequency band. The system 102 is programmed to then calculate the list of statistical features from the sets of values for each frequency band of the plurality of frequency bands for each segment of the group of segments to obtain a group of lists of statistical features. The system 102 is programmed to finally build the classification model from group of lists of statistical features. In certain embodiments, the classification model is a Gaussian mixture model, adaptive boosting algorithm, support vector machine, or deep neural network.

In some embodiments, the system 102 is programmed to incorporate the first statistical feature, an index of the one frequency band in association with the first statistical feature, and the second statistical feature into a feature vector.

In step 608, the system 102 is programmed to execute the classification model with the list of statistical features or the feature vector as input data and an indication of whether the digital audio content is UGC or PGC as output data.

In some embodiments, the system 102 is programmed to execute the classification model with the set of temporal features as first additional input data. In other embodiments, the system 102 is programmed to execute the classification model with the set of spectral features as second additional input data. In additional embodiments, the system 102 is programmed to execute the classification model with the certain set of temporal features and the certain set of spectral features as third additional input data.

In some embodiments, the system 102 is further programmed to process the digital audio content based on a result of the determining and send a result of the processing to a playback device.

In step 610, the system 102 is programmed to transmit the output data.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Various aspects of the disclosed embodiments may be appreciated from the following enumerated example embodiments (EEEs):

EEE 1. A computer-implemented method of classifying audio as user-generated content (UGC) or professionally generated content (PGC), comprising receiving, by a processor, digital audio content having two channels in a time-frequency representation over a plurality of frames and a plurality of frequency bands; computing, by the processor, a respective set of values of a corresponding set of spatial indicators for each frame of at least a subset of the plurality of frames and each frequency band of the plurality of frequency bands to obtain sets of values for each frequency band, the set of spatial indicators being applied to the two channels and including at least one of an interaural level difference (ILD), an interaural phase difference (IPD), or an interaural coherence (IC); calculating a set of statistical features from the sets of values for each frequency band of the plurality of frequency bands, the set of statistical features including a first statistical feature for only one frequency band of the plurality of frequency bands and a second statistical feature over multiple frequency bands of the plurality of frequency bands; executing a classification model with the set of statistical features as input data and an indication of whether the digital audio content is UGC or PGC as output data; and transmitting the output data.

EEE 2. The computer-implemented method of claim 1, further comprising: processing the digital audio content based on a result of the executing; and sending a result of the processing to a playback device.

EEE 3. The computer-implemented method of claim 1 or 2, the computing comprising applying a moving window covering a current frame to the digital audio content and calculating the set of values of the set of spatial indicators over all frames covered by the moving window.

EEE 4. The computer-implemented method of any of claims 1-3, the first statistical feature being a mean or a variance of values of a spatial indicator over the subset of frames for each spatial indicator of the set of spatial indicators.

EEE 5. The computer-implemented method of any of claims 1-4, the second statistical feature being a ratio, a numerator of the ratio being related to a value of a spatial indicator that occurs most frequently for each frequency band of a subset of lowest frequency bands of the plurality of frequency bands, a denominator of the ratio being related to a value of the spatial indicator that occurs most frequently for each frequency band of a subset of highest frequency bands of the plurality of frequency bands or for each frequency band of the plurality of frequency bands.

EEE 6. The computer-implemented method of any of claims 1-5, the executing comprising incorporating the first statistical feature, an index of the one frequency band in association with the first statistical feature, and the second statistical feature into a feature vector.

EEE 7. The computer-implemented method of any of claims 1-6, further comprising: receiving digital audio data in a time domain comprising the plurality of frames; and generating the digital audio content from the digital audio data.

EEE 8. The computer-implemented method of claim 7, further comprising computing a set of temporal features from the digital audio data, the executing being performed with the set of temporal features as first additional input data.

EEE 9. The computer-implemented method of claim 7, further comprising: generating processed audio data in a frequency domain from the digital audio data; and computing a set of spectral features from the processed audio data, the executing being performed with the set of spectral features as second additional input data.

EEE 10. The computer-implemented method of claim 7, further comprising: extracting a background portion in a time domain from the digital audio data; generating a spectral portion in a frequency domain from the background portion; computing a certain set of temporal features from the background portion and a certain set of spectral features from the spectral portion; and the executing being performed with the certain set of temporal features and the certain set of spectral features as third additional input data.

EEE 11. The computer-implemented method of any of claims 1-10, further comprising: receiving a group of segments including a plurality of UGC segments and a plurality of PGC segments, each segment of the group of segments having two channels in a time-frequency representation; computing a set of values of the set of spatial indicators for each frame of a plurality of frames in each segment of the group of segments and each frequency band of the plurality of frequency bands to obtain a group of sets of values for each frequency band; calculating the set of statistical features from the sets of values for each frequency band of the plurality of frequency bands for each segment of the group of segments to obtain a group of lists of statistical features; and building the classification model from group of lists of statistical features.

EEE 12. The computer-implemented method of any of claims 1-11, the classification model being a Gaussian mixture model, adaptive boosting algorithm, support vector machine, or deep neural network.

EEE 13. A non-transitory computer-readable medium storing instructions that, upon execution by one or more processors, cause the one or more processors to perform operations of any of claims 1-12.

EEE 14. A computer system for classifying audio as user-generated content (UGC) or professionally generated content (PGC), comprising: a memory; one or more processors coupled to the memory and configured to perform: receiving a group of segments including a plurality of UGC segments and a plurality of PGC segments, each segment of the group of segments having two channels in a time-frequency representation, each segment of the plurality of UGC segment being associated with a UGC label, each segment of the plurality of PGC segment being associated with a PGC label; computing a respective set of values of a corresponding set of spatial indicators for each frame of a plurality of frames in each segment of the group of segments and each frequency band of a plurality of frequency bands to obtain a group of sets of values for each frequency band, the set of spatial indicators being applied to the two channels of each segment of the group of segments and including at least one of an interaural level difference (ILD), an interaural phase difference (IPD), or an interaural coherence (IC); calculating a set of statistical features from the set of values for each frequency band of the plurality of frequency bands for each segment of the group of segments to obtain a group of lists of statistical features, the set of statistical features including a first statistical feature for only one frequency band of the plurality of frequency bands and a second statistical feature over multiple frequency bands of the plurality of frequency bands; building a classification model from group of lists of statistical features; receiving digital audio content having two channels in a time-frequency representation; and assigning a UGC label or a PGC label to the digital audio content using the classification model.

EEE 15. The computer system of claim 14, the one or more processors further configured to perform transmitting the classification model.

EEE 16. The computer system of claim 14 or 15, the computing comprising applying a moving window covering a current frame to a segment and calculating the set of values of the set of spatial indicators over all frames covered by the moving window.

EEE 17. The computer system of any of claims 14-16, the one or more processors further configured to perform: receiving a group of audio items in a time domain; and generating the group of segments from the group of audio items.

EEE 18. The computer system of claim 17, the one or more processors further configured to perform computing a set temporal features from each audio item of the group of audio items to obtain a group of sets of temporal features, the building being performed further from the group of sets of temporal features.

EEE 19. The computer system of claim 17, the one or more processors further configured to perform: generating a group of processed audio items in a frequency domain from the group of audio items; and computing a set of spectral features from each processed audio item of the group of processed audio items to generate a group of sets of spectral features, the building being performed further from the group of sets of spectral features.

EEE 20. The computer system of claim 17, the one or more processors further configured to perform: extracting a background portion in a time domain from each audio item of the group of audio items to obtain a group of background portions; generating a spectral portion in a frequency domain from each background portion of the group of background portions to obtain a group of spectral portions; and computing a set of temporal features from each background portion of the group of background portions to obtain a group of sets of temporal features and a set of spectral features from each spectral portion of the group of spectral portions to obtain a group of sets of spectral features, the building being performed further from the group of sets of temporal features and the group of sets of spectral features.

Figure 7:
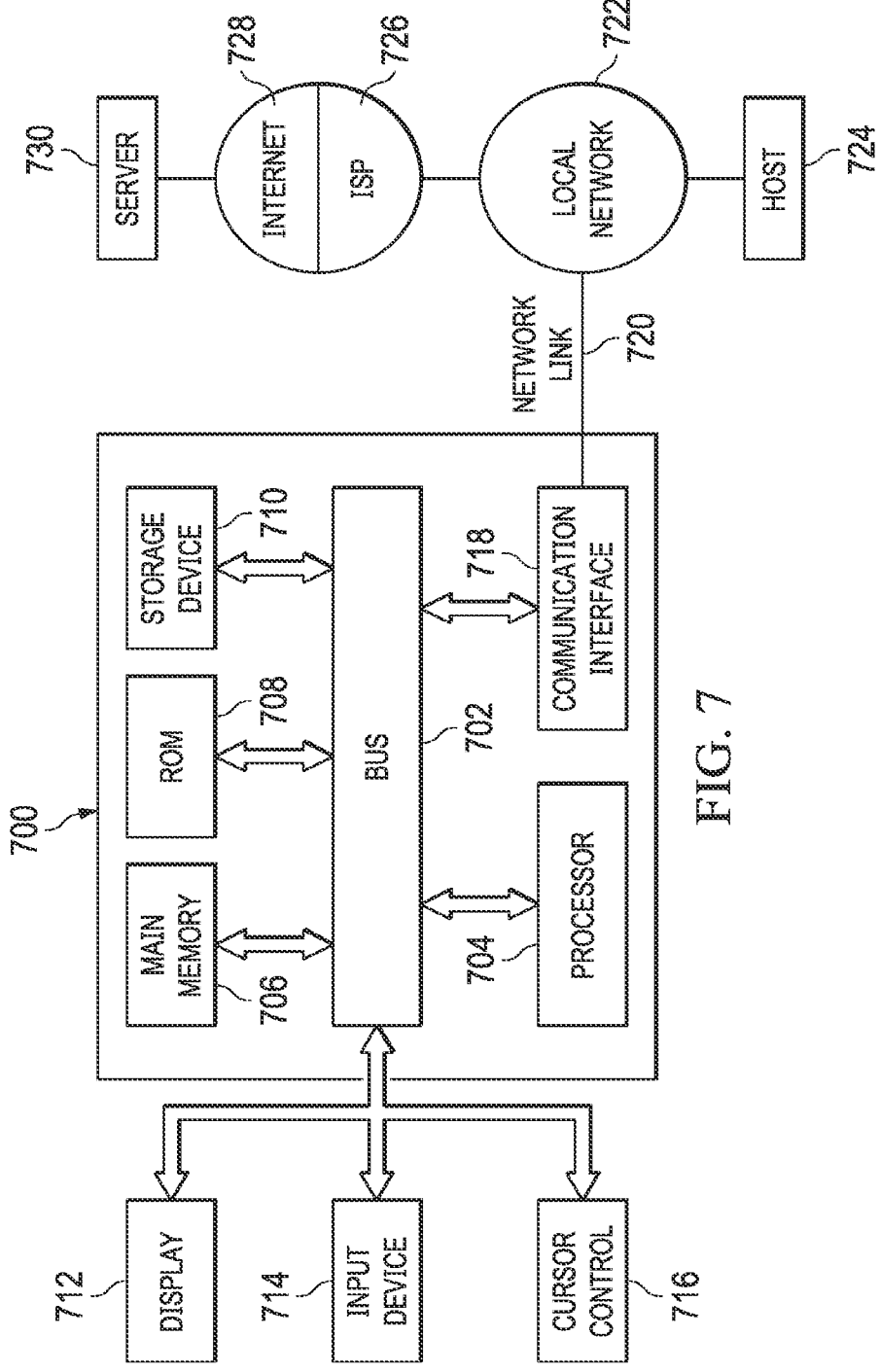
FIG. 7 is a block diagram that illustrates a computer system upon which an embodiment of the invention may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor

704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed:

1. A computer-implemented method of classifying audio as user-generated content (UGC) or professionally generated content (PGC), comprising:

receiving, by a processor, digital audio content having two channels in a time-frequency representation over a plurality of frames and a plurality of frequency bands;

computing, by the processor, a respective set of values of a corresponding set of spatial indicators for each frame of at least a subset of the plurality of frames and each frequency band of the plurality of frequency bands to obtain sets of values for each frequency band, the set of spatial indicators being applied to the two channels and including at least one of an interaural level difference (ILD), an interaural phase difference (IPD), or an interaural coherence (IC);

calculating a set of statistical features from the sets of values for each frequency band of the plurality of frequency bands, the set of statistical features including a first statistical feature for only one frequency band of the plurality of frequency bands and a second statistical feature over multiple frequency bands of the plurality of frequency bands;

executing a classification model with the set of statistical features as input data and an indication of whether the digital audio content is UGC or PGC as output data; and transmitting the output data.

2. The computer-implemented method of claim 1, further comprising:

processing the digital audio content based on a result of the executing; and sending a result of the processing to a playback device.

3. The computer-implemented method of claim 1, the computing comprising applying a moving window covering a current frame to the digital audio content and calculating the set of values of the set of spatial indicators over all frames covered by the moving window.

4. The computer-implemented method of claim 1, the first statistical feature being a mean or a variance of values of a spatial indicator over the subset of frames for each spatial indicator of the set of spatial indicators.

5. The computer-implemented method of claim 1, the second statistical feature being a ratio, a numerator of the ratio being related to a value of a spatial indicator that occurs most frequently for each frequency band of a subset of lowest frequency bands of the plurality of frequency bands, a denominator of the ratio being related to a value of the spatial indicator that occurs most frequently for each frequency band of a subset of highest frequency bands of the plurality of frequency bands or for each frequency band of the plurality of frequency bands.

6. The computer-implemented method of claim 1, the executing comprising incorporating the first statistical feature, an index of the one frequency band in association with the first statistical feature, and the second statistical feature into a feature vector.

7. The computer-implemented method of claim 1, further comprising:

receiving digital audio data in a time domain comprising the plurality of frames; and generating the digital audio content from the digital audio data.

8. The computer-implemented method of claim 7, further comprising computing a set of temporal features from the digital audio data, the executing being performed with the set of temporal features as first additional input data.

9. The computer-implemented method of claim 7, further comprising:

generating processed audio data in a frequency domain from the digital audio data; and computing a set of spectral features from the processed audio data, the executing being performed with the set of spectral features as second additional input data.

10. The computer-implemented method of claim 7, further comprising:

extracting a background portion in a time domain from the digital audio data;

generating a spectral portion in a frequency domain from the background portion;

computing a certain set of temporal features from the background portion and a certain set of spectral features from the spectral portion; and the executing being performed with the certain set of temporal features and the certain set of spectral features as third additional input data.

11. The computer-implemented method of claim 1, further comprising:

receiving a group of segments including a plurality of UGC segments and a plurality of PGC segments, each segment of the group of segments having two channels in a time-frequency representation;

computing a set of values of the set of spatial indicators for each frame of a plurality of frames in each segment of the group of segments and each frequency band of the plurality of frequency bands to obtain a group of sets of values for each frequency band;

calculating the set of statistical features from the sets of values for each frequency band of the plurality of frequency bands for each segment of the group of segments to obtain a group of lists of statistical features; and building the classification model from group of lists of statistical features.

12. The computer-implemented method of claim 1, the classification model being a Gaussian mixture model, adaptive boosting algorithm, support vector machine, or deep neural network.

13. A non-transitory computer-readable medium storing instructions that, upon execution by one or more processors, cause the one or more processors to perform operations of claim 1.

14. A computer system for classifying audio as user-generated content (UGC) or professionally generated content (PGC), comprising:

a memory;

one or more processors coupled to the memory and configured to perform:

receiving a group of segments including a plurality of UGC segments and a plurality of PGC segments, each segment of the group of segments having two channels in a time-frequency representation, each segment of the plurality of UGC segment being associated with a UGC label, each segment of the plurality of PGC segment being associated with a PGC label;

computing a respective set of values of a corresponding set of spatial indicators for each frame of a plurality of frames in each segment of the group of segments and each frequency band of a plurality of frequency bands to obtain a group of sets of values for each frequency band, the set of spatial indicators being applied to the two channels of each segment of the group of segments and including at least one of an interaural level difference (ILD), an interaural phase difference (IPD), or an interaural coherence (IC);

calculating a set of statistical features from the set of values for each frequency band of the plurality of frequency bands for each segment of the group of segments to obtain a group of lists of statistical features, the set of statistical features including a first statistical feature for only one frequency band of the plurality of frequency bands and a second statistical feature over multiple frequency bands of the plurality of frequency bands;

building a classification model from group of lists of statistical features;

receiving digital audio content having two channels in a time-frequency representation; and assigning a UGC label or a PGC label to the digital audio content using the classification model.

15. The computer system of claim 14, the one or more processors further configured to perform transmitting the classification model.

16. The computer system of claim 14, the computing comprising applying a moving window covering a current frame to a segment and calculating the set of values of the set of spatial indicators over all frames covered by the moving window.

17. The computer system of claim 14, the one or more processors further configured to perform:

receiving a group of audio items in a time domain; and generating the group of segments from the group of audio items.

18. The computer system of claim 17, the one or more processors further configured to perform computing a set temporal features from each audio item of the group of audio items to obtain a group of sets of temporal features, the building being performed further from the group of sets of temporal features.

19. The computer system of claim 17, the one or more processors further configured to perform:

generating a group of processed audio items in a frequency domain from the group of audio items; and computing a set of spectral features from each processed audio item of the group of processed audio items to generate a group of sets of spectral features, the building being performed further from the group of sets of spectral features.

20. The computer system of claim 17, the one or more processors further configured to perform:

extracting a background portion in a time domain from each audio item of the group of audio items to obtain a group of background portions;

generating a spectral portion in a frequency domain from each background portion of the group of background portions to obtain a group of spectral portions; and computing a set of temporal features from each background portion of the group of background portions to obtain a group of sets of temporal features and a set of spectral features from each spectral portion of the group of spectral portions to obtain a group of sets of spectral features, the building being performed further from the group of sets of temporal features and the group of sets of spectral features.

* * * * *